Figure 1:
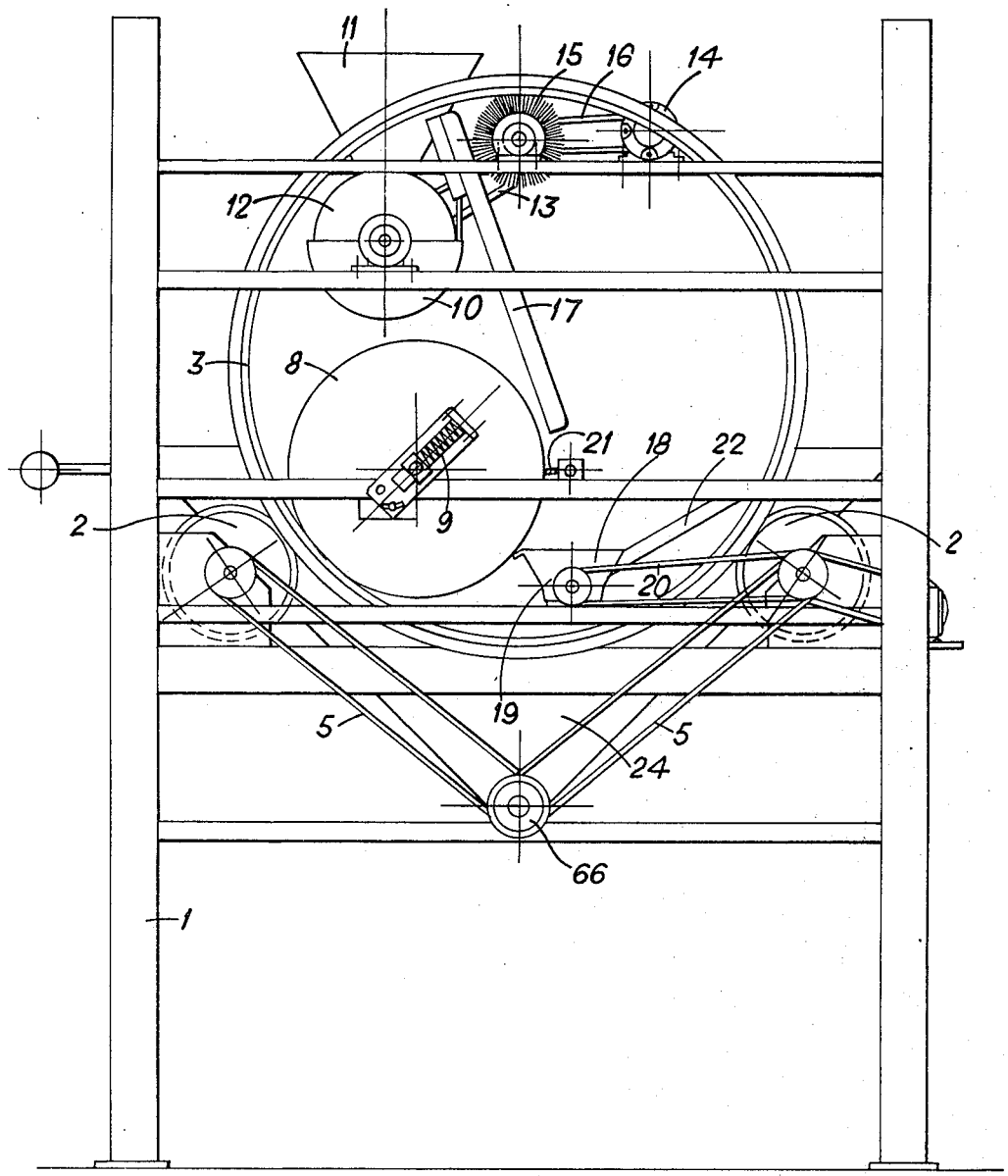

United States Patent [19]
Dall'Argine et al.

[11] 3,878,996
[45] Apr. 22, 1975

[54] SHREDDING MACHINE FOR TOMATO PULP INTENDED FOR CANNING IN THE RAW STATE

[75] Inventors: Gianfranco Dall'Argine; Ermes Ghiretti, both of Parma, Italy

[73] Assignee: Dall'Argine & Ghiretti s.n.c., Stradella De Collecchio, Parma, Italy

[22] Filed: Sept. 28, 1973

[21] Appl. No.: 401,576

[30] Foreign Application Priority Data
Oct. 24, 1972 Italy .................. 46929/72

[52] U.S. Cl. .................. 241/84.2; 241/85
[51] Int. Cl. .................. B02c 17/10
[58] Field of Search .............. 241/84, 84.2, 85, 86; 259/540, 584, 585, 593

[56] References Cited
UNITED STATES PATENTS
1,724,441  8/1929  Weir .................. 241/84.2
2,797,718  7/1957  Dawkings et al. .......... 241/84.2
3,656,528  4/1972  Menacci .................. 241/86

Primary Examiner—Roy Lake
Assistant Examiner—E. F. Desmond
Attorney, Agent, or Firm—Brisebois & Kruger

[57] ABSTRACT

Machine for reducing tomato pulp into small pieces comprises a hollow cylindrical body on the cylindrical surface of which a plurality of identical holes encircled by cutting edges is located; the hollow cylindrical body rotates about its horizontal axis, and a cylindrical roller of small diameter is housed within and elastically pressed against the cylindrical surface of the outer cylinder; this roller obliges the tomatoes fed by suitable means into the cylindrical body to emerge from the holes therein.

6 Claims, 3 Drawing Figures

SHREDDING MACHINE FOR TOMATO PULP INTENDED FOR CANNING IN THE RAW STATE

SUMMARY OF THE INVENTION

At present the processing of tomatoes is carried out in two different ways. Tomatoes of best quality, which are perfect in their shape and perfectly peeled, not having undergone damage during any of these operations, are canned in the form of whole "peeled tomatoes", which are products of high esteem and quality, and of high cost.

However those tomatoes which are not perfectly ripe, or which have been damaged during previous operations so as to render them unsuitable for canning in the form of whole "peeled tomatoes" are fed to the concentration process from which tomato concentrate is obtained.

The great price difference existing between canned peeled tomatoes and tomato concentrate makes the production of the concentrate inconvenient in practice from the economical point of view, so much so that recourse is made to the concentrate almost exclusively in order to recover the product which cannot be canned in the peeled form.

However the use of the peeled tomato has its drawbacks; in spite of its attractive appearance, it contains an outside layer which is partially cooked during the peeling process, which in addition to damaging the sugar layers existing under the skin favours the production of organic liquid which impairs the quality of the product.

Moreover peeled tomatoes are canned perfectly whole without the seeds being previously removed.

The presence of seeds inside the peeled tomatoes makes their use in the kitchen by the houswife inconvenient, because before use they must be cut and cleaned in a similar manner to fresh tomatoes.

The aforegoing situation makes immediately evident the advantage of a process for treating tomatoes which can also be carried out on fruit which is not of first quality, and in which the fruit is used in the raw state without previous scalding and suitably free of seeds, but without any of the merits and advantages of known peeled tomatoes being absent from the finished product.

To this end in recent years a product has been derived which can be placed halfway in its commercial merits between the peeled tomato and tomato concentrate.

This product consists of tomato pulp reduced to small pieces which, still in the raw state, are canned similar to peeled tomatoes, and can also be obtained from fruit which is aesthetically imperfect or partially damaged during previous operations.

The success obtained by this type of canned raw tomato has made cans of tomato produced in this way continually more required because of the advantages of use with respect to known peeled tomatoes, and also because of the lower price due to the lower incidence of rejects.

These advantages are summarised in the absence of surface scalding necessary for peeling by known systems, and in the absence of seeds the presence of which can be annoying or harmful in the preparation of food dishes.

The present invention relates to a machine able to prepare tomatoes for canning in the aforementioned form, starting from tomatoes which may be partially damaged externally, imperfect aesthetically and without seeds. In the tomato processing industry, machines are already known for removing seeds from tomatoes, called seed removers, and these machines are used upstream of the device according to the present invention.

To the device are hence fed raw unpeeled tomatoes free from seeds, the device itself being given the task of removing the skin and making the tomato pulp available in the form of small pieces arranged for subsequent canning in their own liquid, for supply raw to the consumer.

The device according to the invention consists of a separator cylinder provided with a plurality of peripheral holes on its generating surface, mounted on a horizontal axis and rotated by suitable means.

The tomatoes to be treated are fed to the inside of said roller in a constant manner over the whole of its length by a feeder which may conveniently consist of an upwardly open channel, arranged to contain a feeder screw.

Inside this cylinder is mounted a roller having solid walls kept pressed by suitable springs against the separator cylinder, arranged to squash the fruit thus fed against the inner wall of the cylinder so as to oblige the fruit to leave through the holes in the form of small pieces and to collect in an underlying tank.

Means are also provided to remove the tomato skin which gathers on the outer surface of the pressure roller and on the inner surface of the separator cylinder, and to bring said skin and other similarly collected waste matter to the outside.

Furthermore according to the invention the pressure roller may be conveniently heated by circulation of hot water or steam so as to favour a previous pasteurisation of the product, to the advantage of rapidity in the subsequent process of product canning.

Said heating may also be applied, according to the invention, to the seed removal means located upstream, in addition to the pressure roller.

In fact these seed removal means, which consist of two gears which have a certain radial clearance from each other, are suitable for being heated by circulation of water or steam.

Figure 2:
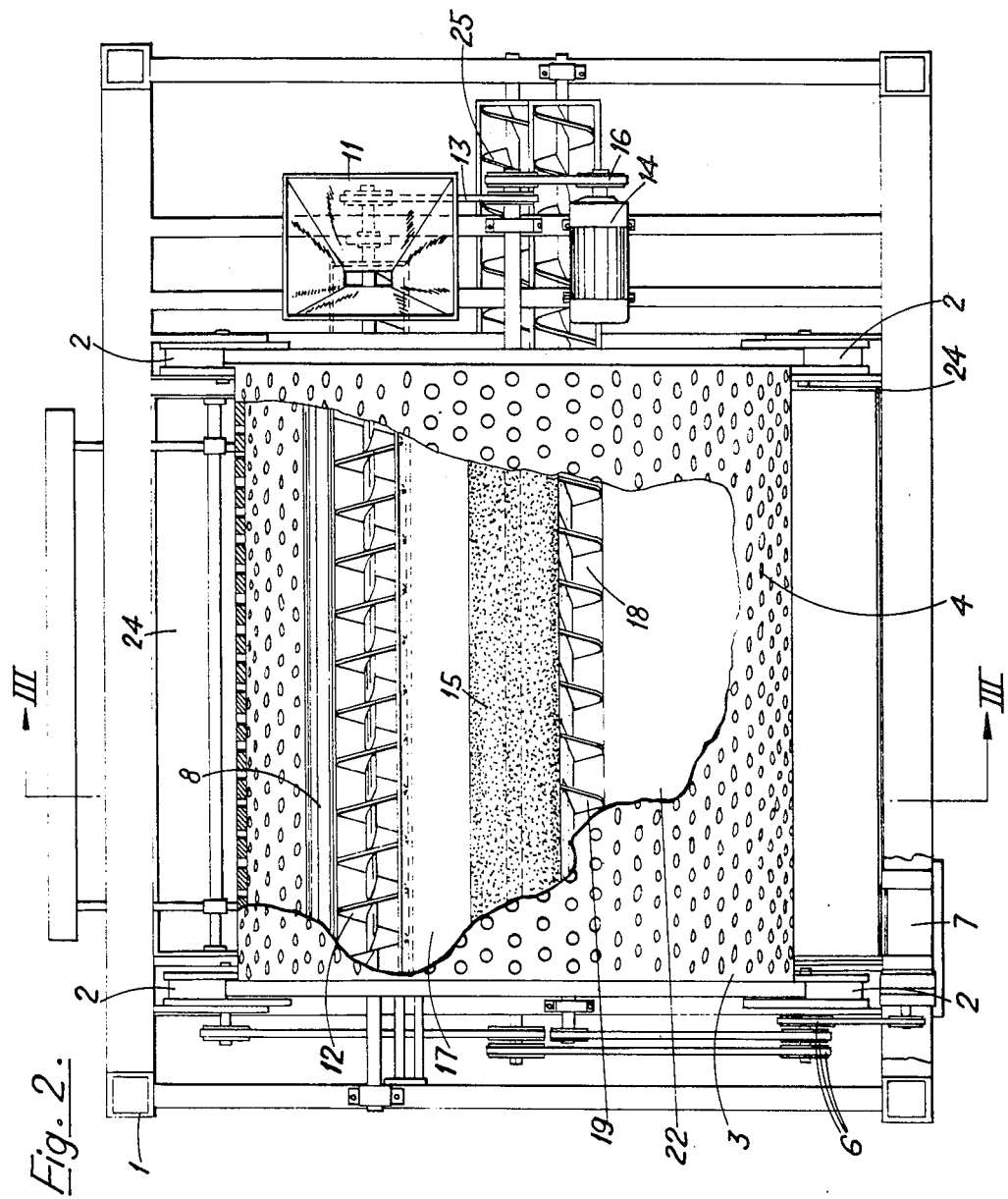
Figure 3:
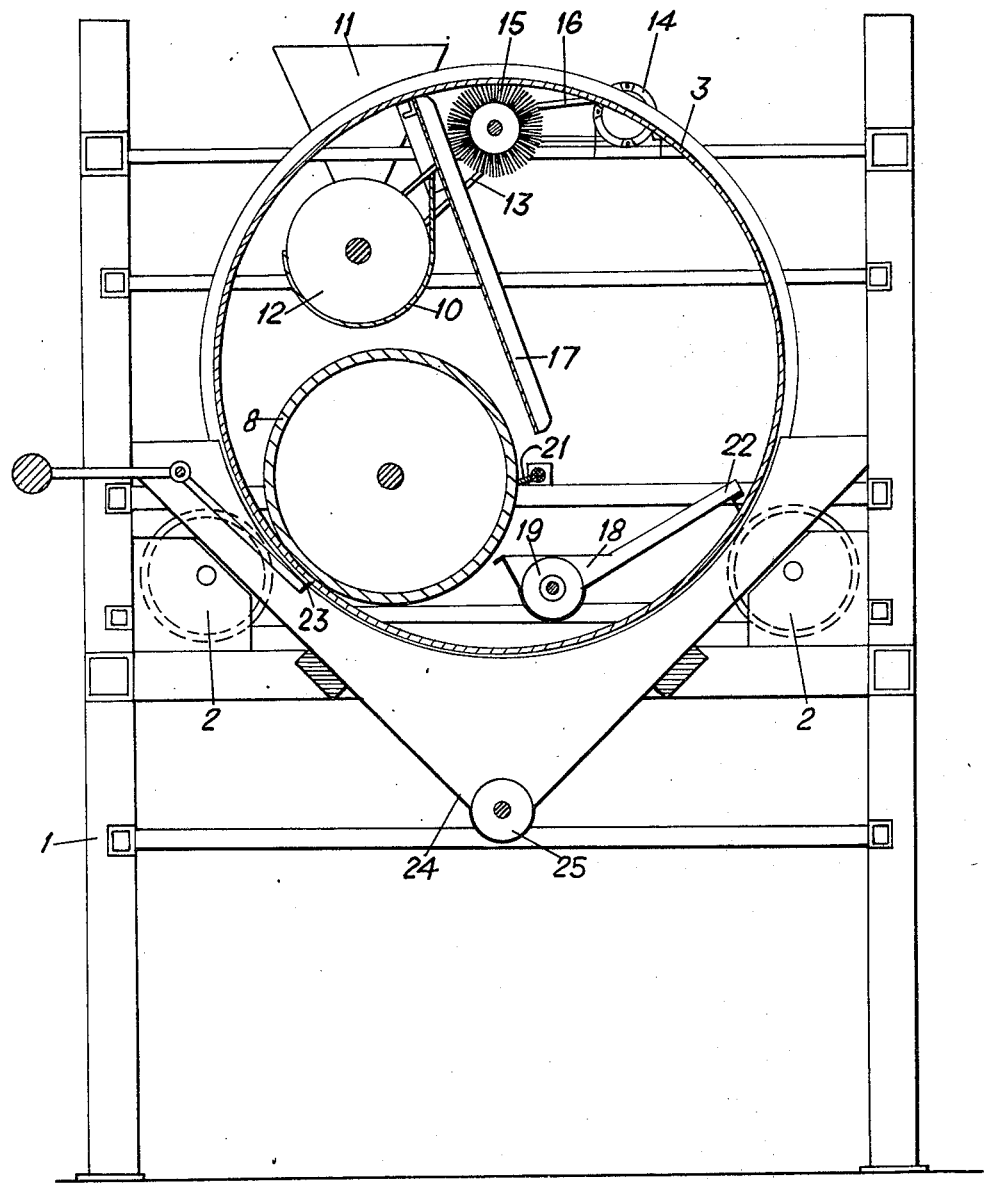

The merits and constructional and operational characteristics of the invention will be more evident from the detailed description given hereinafter, which illustrates a preferred embodiment of the invention, illustrated in the figures of the accompanying drawings in which:

FIG. 1 is a frontal view of the invention;
FIG. 2 is a plan view of the invention; and
FIG. 3 is a section taken along the line III—III of FIG. 2.

Said figures show the frame 1 on which four coplanar rollers 2 with central peripheral grooves are mounted in coaxial pairs, and support the perforated separator cylinder 3. This cylinder comprises a plurality of holes 4 encircled by cutting edges over its entire generating surface.

The cylinder 3 is rotated by one pair of rollers 2 individually driven by the two drive belts 5 each passing over the wheels 6 rotated by the motor 7.

Inside the cylinder 3 is housed the cylindrical roller 8 having a solid wall kept pressed against the drum 3 of springs 9.

Above the drum 8 is a channel member 10 terminating in a hopper 11 for loading the tomatoes to be treated, and within which rotates a feeder screw 12 arranged to make the tomatoes flow over the edge of the channel member 10 along the entire length of the cylinder 3.

The feeder screw 12 is driven by a belt 13 from the independent motor 14 which also rotates the cylindrical brush 15 by means of a further belt 16.

The cylindrical brush 15 is arranged to keep the inner surface of the cylinder 3 free from tomato skin which remains attached to it.

The skin is directed downwards by a sheet metal apron 17.

Below the cylinder 8 there is a second channel member 18 in the bottom of which a further feeder screw 19 operates, rotated by a belt drive 20 terminating at one of the wheels 6.

The channel member 18 is arranged to collect both the skin removed by the cylindrical brush 15 and the skin which is removed from the roller 8 by the longitudinal scraper 21.

A further sheet metal apron 22 is arranged to prevent the skin from returning to the inner surface of the drum 3.

A further counterweighted scraper 23 is arranged to keep the outer surface of the drum 3 clean.

Below the drum 3 there is a collection hopper 24 at the base of which there is a feeder screw 25 for removing the finished product.

The shaft of the screw 25 is coaxial with the grooved wheel 66 and is driven by the same motor 7 which drives the wheels 6.

The operation of the machine heretofore described is as follows.

The tomatoes are fed to the hopper 11 and distributed from the hopper by means of the screw 12 and channel member 10 over the entire length of the cylinder 3 and roller 8.

The tomatoes fall from the channel member 10 and are squashed between the inner surface of the cylinder 3 and outer surface of the roller 8 so that they are obliged to emerge from the holes 4, being reduced to small pieces by the cutting edges of holes.

The skin and other extraneous matter remains sticking to the inner surface of the cylinder 3 and outer surface of the roller 8.

The pieces of tomato which leave from the bottom of the cylinder 3 are collected in the hopper 24 and removed by the screw 25.

The skin and other waste material is removed from the inner surface of the cylinder 3 by the cylindrical brush 15 and from the outer surface of the roller 8 by the scraper 21, and falls into the channel member 18, from the bottom of which it is removed by the screw 19.

The invention is not limited to the single embodiment herein described, and modifications and improvements may be made to it without thereby departing from the scope of the invention, the fundamental characteristics of which are summarised in the following claims.

What we claim is:

1. A machine for reducing tomatoes and parts thereof into small pieces, said machine comprising:
   a hollow cylinder defining in its cylindrical surface a plurality of holes encircled by cutting edges,
   a plurality of guide and support rollers mounted to externally support and drive said cylinder,
   a pressure roller of smaller diameter than said cylinder and mounted within said cylinder to rotate about an axis parallel to that of said cylinder,
   means resiliently urging said pressure roller against the inner surface of said hollow cylinder,
   means for feeding said tomatoes and parts thereof into said hollow cylinder above the area of contact between said pressure roller and cylinder, so that said pressure roller forces the pulp of said tomatoes out of said cylinder through said holes, while any skin associated therewith is retained within said cylinder,
   means for collecting the pulp forced to the outside of said cylinder, and
   means for removing said skin from the inside of said cylinder.

2. A machine as claimed in claim 1 in which the means for feeding said tomatoes into said cylinder comprise an upwardly open channel member terminating at one end beneath a feed hopper, and a helical screw mounted to rotate in said channel member, thereby advancing said tomatoes into said cylinder and causing them to overflow the walls of said channel member.

3. A machine as claimed in claim 1 in which the means for removing skin comprise a cylindrical brush mounted to rotate in the upper part of said cylinder about an axis parallel to that of said cylinder, with its bristles in contact with the inner surface of said cylinder, a scraper arranged to scrape the surface of the pressure roller, and a lower channel member positioned to receive the scrapings from said scraper, said channel member containing a longitudinal screw for advancing said scrapings to a point outside said cylinder.

4. A machine as claimed in claim 1 in which the means for collecting said pulp comprise a hopper situated beneath the hollow cylinder, and extending longitudinally thereof, said pulp-collecting hopper containing a screw for advancing said pulp longitudinally of said hopper.

5. A machine as claimed in claim 1 in which there are four of said guide and support rollers, mounted in coaxial pairs, said cylinder being provided with radial flanges at each end and said guide and support rollers being grooved to receive said flanges, said machine further comprising a belt drive for driving at least one of said pairs of rollers.

6. A machine as claimed in claim 1 comprising a first motor connected to drive said driving and support rollers and said skin removing means and a second motor connected to drive said tomato feeding means.

* * * * *